(12) United States Patent
Hintz et al.

(10) Patent No.: US 11,787,349 B2
(45) Date of Patent: Oct. 17, 2023

(54) ROOF STRUCTURE FOR A VEHICLE

(71) Applicant: PEIKER acustic GmbH, Friedrichsdorf (DE)

(72) Inventors: Torsten Hintz, Créteil (FR); Giovanni Monteleone, Créteil (FR); Marcus Normann, Créteil (FR)

(73) Assignee: PEIKER acustic GmbH, Friedrichsdorf (DE)

( * ) Notice: Subject to any disclaimer, the term of this patent is extended or adjusted under 35 U.S.C. 154(b) by 138 days.

(21) Appl. No.: 17/414,632

(22) PCT Filed: Oct. 2, 2019

(86) PCT No.: PCT/EP2019/076761
§ 371 (c)(1),
(2) Date: Jun. 16, 2021

(87) PCT Pub. No.: WO2020/126144
PCT Pub. Date: Jun. 25, 2020

(65) Prior Publication Data
US 2022/0063511 A1 Mar. 3, 2022

(30) Foreign Application Priority Data

Dec. 19, 2018 (DE) .................. 10 2018 132 844.3
Dec. 19, 2018 (DE) .................. 10 2018 132 845.1
(Continued)

(51) Int. Cl.
*B60R 11/02* (2006.01)
*B60R 13/02* (2006.01)
(Continued)

(52) U.S. Cl.
CPC .......... *B60R 11/0247* (2013.01); *B32B 3/266* (2013.01); *B60R 13/0212* (2013.01);
(Continued)

(58) Field of Classification Search
CPC ......... B60R 13/0212; B60R 2011/0028; B60R 11/0247
(Continued)

(56) References Cited

U.S. PATENT DOCUMENTS 8,477,980 B2 * 7/2013 Li ..................... H04R 1/086
381/365
10,171,897 B2 * 1/2019 Hart .................. H04R 1/025

FOREIGN PATENT DOCUMENTS

DE 102004019827 A1 9/2005
DE 102012002414 A1 8/2013
(Continued)

OTHER PUBLICATIONS

International Search Report and Written Opinion corresponding International Application No. PCT/EP2019/076761, dated Nov. 25, 2019 (9 pages).

*Primary Examiner* — Dennis H Pedder
(74) *Attorney, Agent, or Firm* — Osha Bergman Watanabe & Burton LLP

(57) ABSTRACT

Roof structure (1) for a vehicle, wherein the roof structure (1) comprises a roof sky (2), wherein the roof sky comprises a foam or sandwich layer (3) and a surface layer (4) covering the foam or sandwich layer preferably to a vehicle interior and wherein a microphone unit (5) is arranged at the foam or sandwich layer (3), the microphone unit (5) comprises at least one mounting means (6), the foam or sandwich layer (3) comprises at least one recess (7) to receive the at least one mounting means (6) and the mounting means (6) of the microphone unit (5) in a mounted condition of the microphone unit (5) is arranged in the at least one recess (7) thereby holding the microphone unit (5) at the foam or sandwich layer (3).

10 Claims, 12 Drawing Sheets

(30) Foreign Application Priority Data

Dec. 19, 2018 (DE) .................... 10 2018 132 847.8
Dec. 19, 2018 (DE) .................... 10 2018 132 848.6
Dec. 19, 2018 (DE) .................... 10 2018 132 943.1

(51) Int. Cl.
*B32B 3/26* (2006.01)
*B62D 25/06* (2006.01)
*B62D 29/04* (2006.01)
*H04R 1/08* (2006.01)
*B60R 11/00* (2006.01)

(52) U.S. Cl.
CPC ........... *B62D 25/06* (2013.01); *B62D 29/043* (2013.01); *H04R 1/08* (2013.01); *B32B 2250/40* (2013.01); *B32B 2605/00* (2013.01); *B60R 2011/0028* (2013.01); *H04R 2499/13* (2013.01)

(58) Field of Classification Search
USPC .............................. 296/1.07, 214; 381/86, 87
See application file for complete search history.

(56) References Cited

FOREIGN PATENT DOCUMENTS

| | | |
|---|---|---|
| EP | 1332922 A2 | 8/2003 |
| JP | H0558228 A | 3/1993 |

\* cited by examiner

ROOF STRUCTURE FOR A VEHICLE

BACKGROUND OF THE INVENTION

A vehicle is known from DE 10 2004 019 827 A1, which vehicle comprises a multilayer roof structure and a microphone unit integrated into the roof structure or in a lampdome, wherein the roof structure comprises a lower covering layer visible from a vehicle interior space, an upper covering layer delimiting the vehicle relative to the surroundings, a supporting layer carrying the lower covering layer and lying between the lower and the upper covering layers, and wherein the microphone unit comprises a sound entry, region and at least one microphone. It is disadvantageous in the vehicle disclosed in DE 10 2004 019 827 A1, that the microphone unit is visible to the occupants when the sunshade is folded down and also leads the occupants, as a result of it being visible, to check the microphone unit for a tight fit. By repeated checking of the microphone unit, unwanted damage to the microphone unit can be caused.

From document DE 10 2012 002 414 A1 a vehicle with roof structure is known, wherein the roof structure comprises a roof sky, wherein the roof sky comprises a foam or sandwich layer and a surface layer covering the foam or sandwich layer to a vehicle interior and wherein a microphone unit is arranged at the foam or sandwich layer. As a disadvantage, the microphone unit is mounted to the roof structure mostly by an adhesive bond, which can cause problems in cases the microphone unit should be removed.

SUMMARY OF THE INVENTION

It is an object of the invention to propose for example a roof structure for a vehicle in which the microphone unit is integrated into the roof structure in a replaceable way with less modifications of the roof structure as possible.

With the roof structure according to the invention, the microphone unit comprises at least one mounting means, the foam or sandwich layer comprises at least one recess to receive the at least one mounting means and the mounting means of the microphone unit in a mounted condition of the microphone unit is arranged in the at least one recess thereby holding the microphone unit at the foam or sandwich layer.

The non-adhesive arrangement of the microphone unit at the foam or sandwich layer enables to ensure high quality mounting of the microphone unit in the roof structure of the vehicle and a simplified removing of the microphone unit if necessary. It is a further advantage that the microphone unit can be integrated in the roof structure invisibly thereby maintaining an aesthetic impression of the roof structure.

The invention provides that the at least one mounting means is designed as a clamping means. A clamping means enables a safe fastening of the microphone unit, particularly via spring forces, hence non-adhesive.

The invention provides that the microphone unit comprises at least one positioning means and the foam or sandwich layer comprises at least a further recess for the reception of the at least one positioning means, wherein the at least one positioning means is in an mounted condition of the microphone unit taken up in the at least one further recess. The use of at least one positioning means arranged in a recess within the foam or sandwich layer enables an additional fixing or mounting possibility of the microphone unit. Further, mounting stability of the microphone unit can be enhanced.

The invention provides that the microphone unit comprises two positioning means, wherein the two positioning means are each designed as protrusions. Mounting stability of the microphone unit can be further enhanced.

It is possible that the protrusions each comprise a preferably circumferential collar.

According to the invention the recess for the mounting means and the further recess for the positioning means are arranged oppositely. This enables an optimized interaction between mounting means and positioning means and thus a highly stable fixation of the microphone unit.

The invention provides that the at least one recess for the positioning means is formed as a cylindrical drilling, in particular as a blind hole drilling. A stable mounting or fixing of the microphone unit can be enabled with less technical effort.

In order to achieve a stable fixation of the microphone unit, the invention provides that the clamping means comprises two arms and a spring element, wherein a bolt is arranged at each arm, wherein the arms are spreadable by the spring element, wherein the microphone unit comprises two guideways, wherein the guideways are designed in such a manner that the bolts are displaceable within the guideways in such a way that a distance of the bolts increases by stretching the spring element and decreases by releasing the spring element, wherein as a groove designed recess is arranged in the foam layer for guiding each bolt and for attachment of the microphone unit to the foam layer, wherein the groove is limited by a circumferential wall and wherein the bolts are in mounted condition of the microphone unit each pressed by the spring element in opposite orientated force directions against the walls.

According to the invention the protrusions can be made of rubber, in particular of Evoprene. Flexible protrusions may allow a simplified assembly of the microphone unit and a stable fixation within the recess or recesses.

The invention provides that the mounting means is designed as a swivelling rotor. Such a mounting means is easy to handle thereby enabling a stable fixation of the microphone unit.

According to the invention the mounting means is in a mounted condition partly arranged in the recess and partly cut into a region of the foam material of the foam layer, which surrounds the recess. The stability of the fixation can be increased additionally.

The invention provides that the mounting means is designed as rotor comprising at least one wing. This is a simple way to get a highly effective mounting means for a stable fixation of the microphone unit, in particular by way of turning or rotation the mounting means, e.g. wing, relative to the recess.

The invention provides that the recess taking up the mounting means is designed as a groove. A groove can be provided without much effort and enables a stable fixation of the microphone unit.

The invention provides that the microphone unit comprises two mounting means each designed as spring arms which spring arms and the microphone unit are formed in one piece. Such a component may be produced with less effort.

The invention also provides that the microphone unit comprises two mounting means each designed as spring arms, which spring arms and the microphone unit are formed as separate pieces. Demounting of partially broken parts may be simplified.

According to the invention the clamping means comprises two arms, wherein the microphone unit further comprises an activation means, wherein the arms of the clamping means are moveable by actuating the activation means in such a manner that in a mounted condition of the microphone unit the arms are spread at least partly into foam material of the foam layer surrounding the recess. This interaction between mounting means and foam layer or foam layer material respectively enables a highly stable fixation of the microphone unit. It is a further advantage that the microphone unit can also be demounted in a very fast and simple way without destroying the microphone unit or the foam layer.

According to the invention the microphone unit comprises two clamping means, wherein the clamping means are designed as spring arms, wherein the clamping means in a mounted condition each intervene in a recess arranged in the foam layer. This enables a very efficient and permanent fixation of the microphone unit but also simplified disassembly if necessary.

According to the invention the foam layer comprises two further recesses for the reception of two positioning means, comprised by the microphone unit, wherein the positioning means in a mounted condition of the microphone unit are each taken up in the further recesses, wherein the microphone unit is in a mounted condition held at the foam layer by retention forces generated by the spring arms.

The use of two positioning means arranged in a recess within the foam layer enables an additional fixing or mounting possibility of the microphone unit. Further, mounting stability of the microphone unit can be enhanced significantly.

According to the invention the two recesses for the mounting means and the two recesses for the positioning means each being arranged on a meant line. Such an optimized arrangement enables an enhanced mounting stability of the microphone unit.

The invention provides that the two recesses for the mounting means and the two further recesses for the positioning means are each formed as cylindrical drillings, in particular blind hole drillings. A stable mounting or fixing of the microphone unit can be enabled with less technical effort.

The invention provides that free ends of the spring arms, which are in a mounted condition of the microphone unit taken up in the recesses being designed as curved pads. By way of such an at least partly form fitting arrangement of the mounting means within the recess or recesses enable(s) a stable mounting or fixation of the microphone unit is enabled.

Finally the invention provides that the spring arms, in particular the pads of the spring arms, each comprise at least one edge. This allows an additionally improved mounting of the microphone unit as the edge or edges can at least partly cut into the material of the foam layer.

It is further object of the invention to provide a vehicle, comprising a roof structure according to the invention. The non-adhesive arrangement of the microphone unit at the foam or sandwich layer enables to ensure high quality mounting or the microphone unit in the roof structure of the vehicle and a simplified removing of the microphone unit if necessary. It is a further advantage that the microphone unit can be integrated in the roof structure invisibly thereby maintaining an aesthetic impression of the roof structure of the vehicle in a fast and cheap way without the glue-process.

The invention further relates to a microphone preferably for a roof structure of a vehicle, characterized in that the microphone unit comprises at least one, preferably two mounting means designed as clamping means. This enables a non-adhesive arrangement of the microphone unit in and/or at the roof structure, preferably of a vehicle.

The invention further relates to an arrangement which allows to assemble a microphone unit in an interior of a vehicle. The arrangement comprises the microphone unit and a device which helps during the assembly to pre-fix the microphone unit and later on helps to withstand the surface pressure of a bolt or a screw or a nut while the microphone unit is fixed with the bolt or the screw or the nut. For example the arrangement comprises the microphone unit and as device a kind of clip. The vehicle comprises a bracket which is prepared in a special way for the clip and comprises for example at least a hole or as slit. The microphone unit is prepared during its production with the clip. While mounting the microphone unit into the vehicle it can be simply placed on the bracket. The clip, which snaps into the hole or the slit of the bracket, holds the microphone unit. This means that the microphone unit is pre-fixed and the microphone unit can now be fixed with at least one fasting means e.g. a screw to the bracket.

The microphone unit according to the invention can be developed as described in the description and/or in the claims In the context of the invention, the terms holding, fixing, clamping or mounting should be seen as equivalents, being optionally exchangeable.

BRIEF DESCRIPTION OF THE DRAWINGS

The foregoing and other features and advantages of the present invention will become apparent to those skilled in the art to which the present invention relates upon reading the following description with reference to the accompanying drawing, in which.

DETAILED DESCRIPTION OF THE INVENTION

Figure 1:
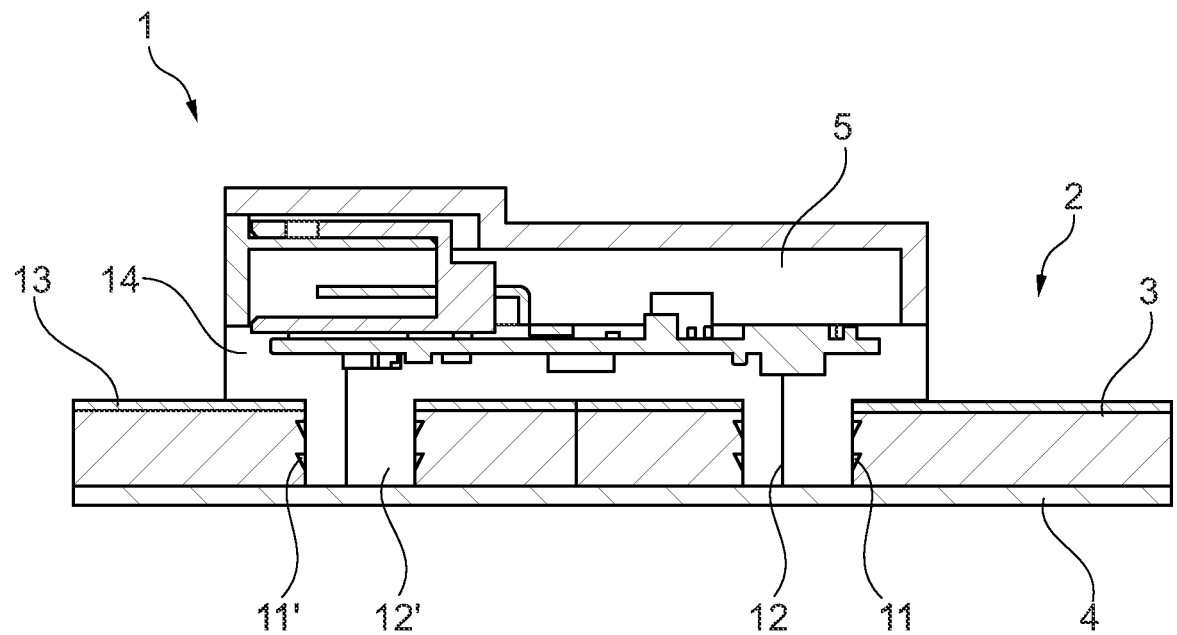
FIG. 1 shows a first embodiment of the roof structure according to the invention in a section view.

FIG. 1 shows the roof structure 1 according to the invention in a section view. The roof structure 1 comprises a roof sky 2, wherein the roof sky 2 comprises a foam or sandwich layer 3 and a surface layer 4 covering the foam or sandwich layer 3, comprising glasfiber on the other side.

The surface layer 4 preferably covers the foam or sandwich layer 3 to a vehicle interior (not shown). The microphone unit 5 is—in a mounted condition at the foam or sandwich layer or in the vehicle respectively—not visible viewed from a vehicle interior or an inside space of an vehicle, e.g. passenger compartment.

Figure 2:
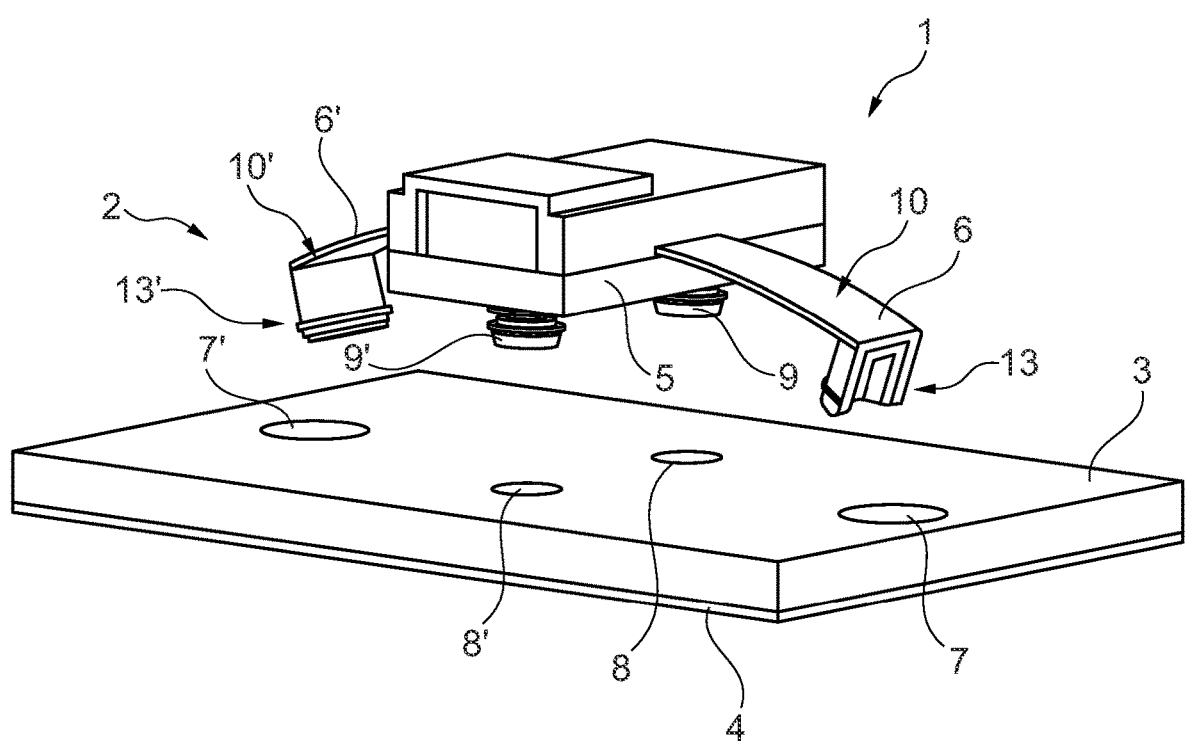
FIG. 2 shows the roof structure according of the invention shown in FIG. 1 in an exploded view.

The roof structure 1 further comprises a microphone unit 5 which is arranged at the foam or sandwich layer 3. Mounting or fixation of the microphone unit 5 at the foam or sandwich layer 3 is achieved via spring forces caused by mounting means 6, 6'. Therefore, the microphone unit 5 comprises mounting means 6, 6' (see FIG. 2) and the foam or sandwich layer 3 comprises recesses 7, 7' (see FIG. 2) to receive the mounting means 6, 6' and the mounting means 6, 6' of the microphone unit 5 in a mounted condition (mounted at the foam or sandwich layer, see FIGS. 1 and 3) of the microphone unit 5 is arranged in the recesses 7, 7' thereby holding or fixing the microphone unit 5 at the foam or sandwich layer 3.

The non-adhesive arrangement of the microphone unit 5 at the foam or sandwich layer 3 enables to ensure high quality mounting of the microphone unit 5 in the roof structure 1 of the vehicle (not shown) and a simplified removing of the microphone unit 5 if necessary. It is a further advantage that the microphone unit 5 can be integrated in the roof structure 1 and in a vehicle respectively in an invisible way thereby maintaining an aesthetic impression of the roof structure 1 and the vehicle respectively.

Figure 3:
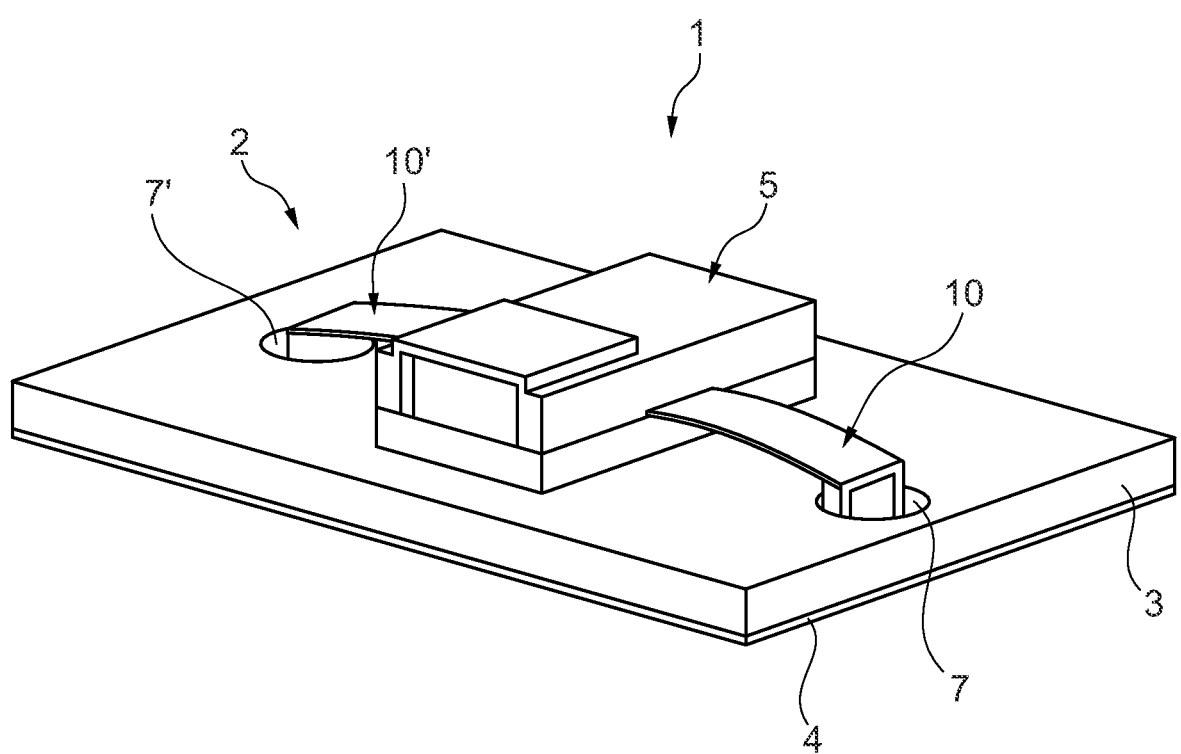
FIG. 3 shows the roof structure as shown in FIG. 1 in a perspective view.

The roof structure 1 comprises mounting means 6, 6' designed as a clamping means in order to enable safe fastening of the microphone unit 5 at the foam or sandwich layer 3 (see FIG. 3).

The mounting means 6, 6' are designed as spring arms 10, 10'. Optionally, the spring arms 10, 10' may comprise protrusions in order to enhance mounting stability in a non-adhesive way.

The microphone unit 5 comprises positioning means 9, 9' and the foam or sandwich layer 3 comprises further recesses 8, 8' for the reception of the positioning means 9, 9'. The positioning means 9, 9' are in an mounted condition of the microphone unit 5 at the foam or sandwich layer 3 (see FIG. 1 or FIG. 3) taken up in the further recesses 8, 8' (see FIG. 2).

The two positioning means 9, 9' are each designed as protrusions 12, 12', each particularly comprising a preferably circumferential collar 11, 11'.

A tool to provide cutted slits can also be provided. The tool can be positioned by further recesses 8, 8'. The tool would make minimum one recess by cutting the slits with an optional marking of the slit by some kind of paint, for example ink.

A recess 7, 7' can also be just a cutted slit.

Foam or sandwich layer 3 could also comprise surface layer 4 generating a sandwich layer. Such a sandwich layer can also be made of different materials, for example cardboard, paper multilayer or any supporting rigid material.

Optionally a roof sky 2 with glasfiber finish 13 can be provided.

Lower part 14 can be made of rubber. Lower part 14 acts as a drawer for PCBA.

Figure 4:
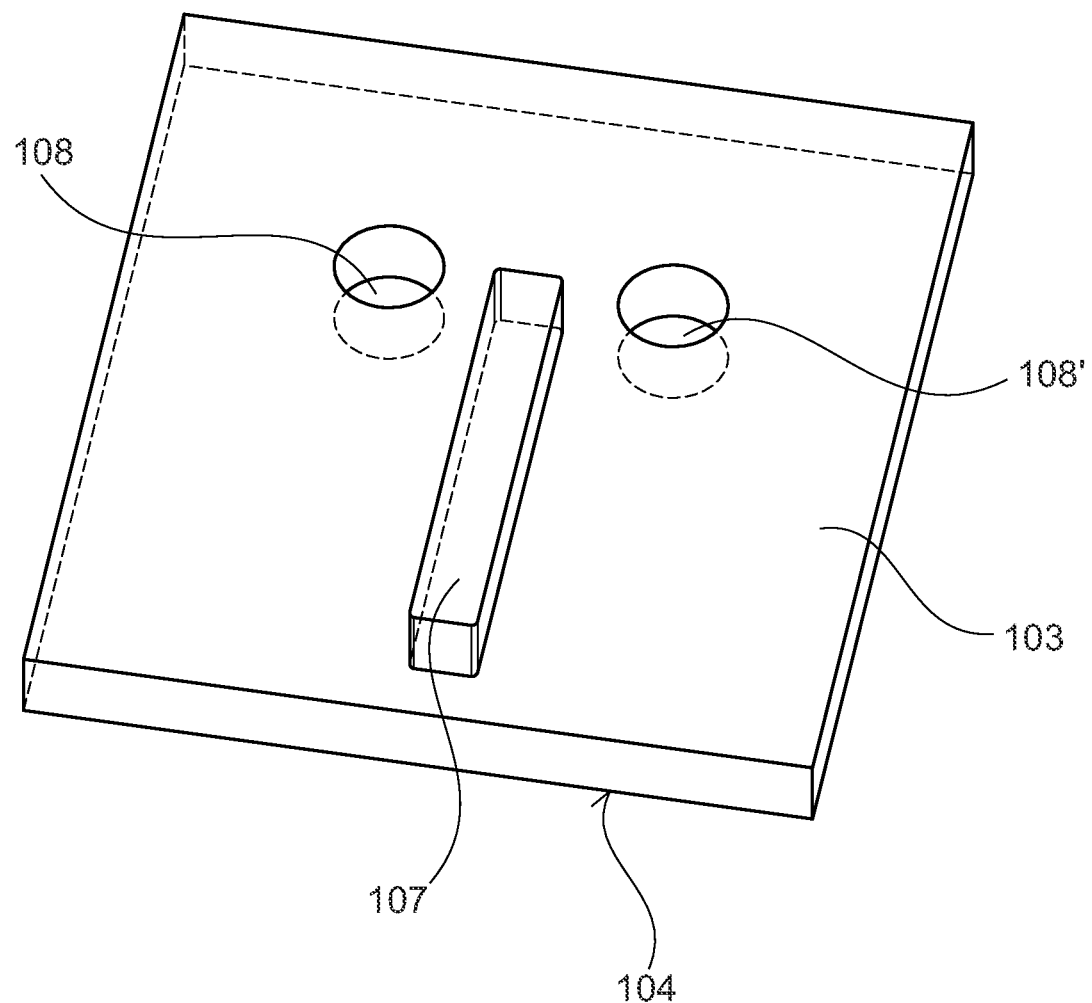
FIG. 4 shows a second embodiment in perspective top view of a foam layer of the roof structure according to the invention.

FIG. 4 shows a perspective top view of a foam layer 103 of the roof structure (see FIG. 5) according to the invention.

The surface layer 104 preferably covers the foam layer 103 to a vehicle interior (not shown). The microphone unit 105 (FIG. 5) is—in a mounted condition at the foam layer or in the vehicle respectively—not visible viewed from a vehicle interior or an inside space of an vehicle, e.g. passenger compartment.

Figure 5:
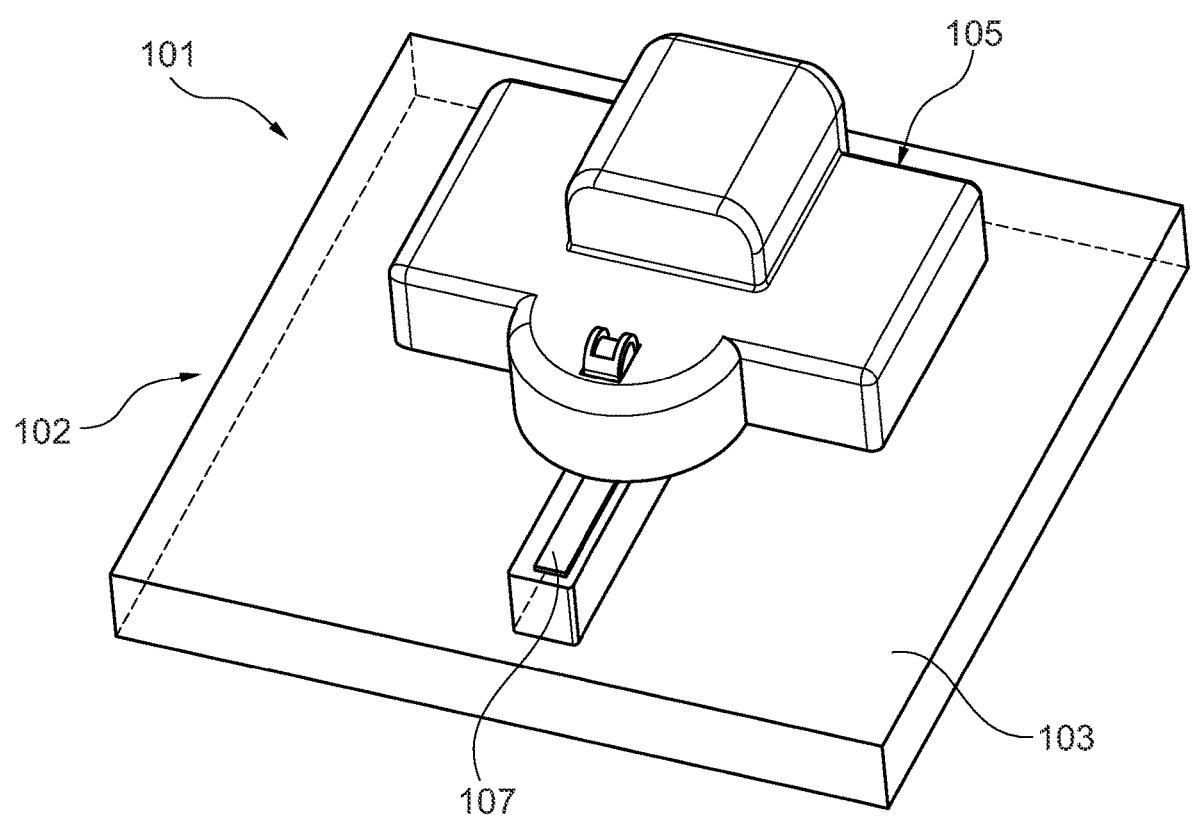
FIG. 5 shows a perspective top view of a roof structure according to FIG. 4 with a microphone unit.

The roof structure 101 according to FIG. 5 comprises a roof sky 102, wherein the roof sky 102 comprises a foam layer 103 and a surface layer 104 covering the foam layer 103. The roof structure according to FIG. 102 further comprises a microphone unit 105 which is arranged at the foam layer 103.

The microphone unit 105 comprises a mounting means 106 (see FIG. 6) and the foam layer 103 comprises a recess 107 (see FIG. 4) to receive the mounting means 106, and the mounting means 106 of the microphone unit 105 in a mounted condition (mounted at the foam layer, see FIG. 5) of the microphone unit 105 is arranged in the recess 107 thereby holding the microphone unit 105 at the foam layer 103.

The recess 107 taking up the mounting means 106 is designed as a groove (see FIG. 4).

Figure 6:
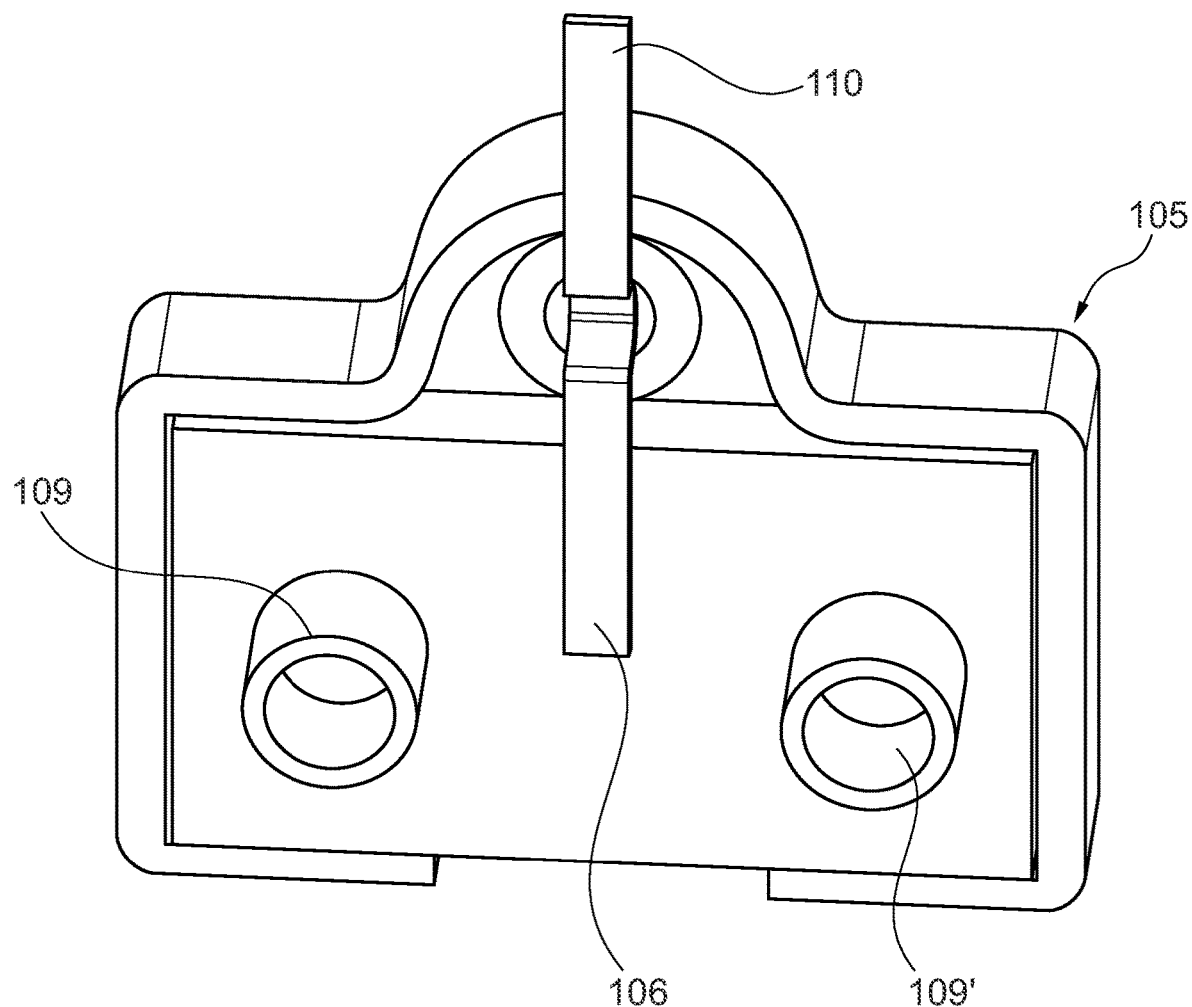
FIG. 6 shows the microphone unit from FIG. 5 in a perspective bottom view.

The roof structure 101 comprises a mounting means 106 designed as a swivelling rotor (see FIG. 6).

Mounting or fixation of the microphone unit 105 at the foam layer 103 can be achieved by rotation of the mounting means 106, namely the swiveling rotor. Rotation of the swivelling rotor causes that swiveling rotor cuts into the foam layer 3, thereby engaging into the foam layer 103 and fixing the microphone unit 105 at the foam layer 103. The mounting means 106 is designed as a rotor comprising at least one wing 110.

In a mounted condition of the microphone unit 105 at the foam layer 103, the mounting means 106 is partly arranged in the recess 107 and partly cut into a region of the foam material of the foam layer 103, which surrounds the recess 107.

The non-adhesive arrangement of the microphone unit 105 at the foam layer 103 enables to ensure high quality mounting of the microphone unit 105 in the roof structure 101 of the vehicle (not shown) and a simplified removing of the microphone unit 105 necessary. It is a further advantage that the microphone unit 105 can be integrated in the roof structure 101 and in a vehicle respectively in an invisible way thereby maintaining an aesthetic impression of the roof structure 101 and the vehicle respectively.

The microphone unit 105 comprises positioning means 109, 109' (see FIG. 6) and the foam layer 103 comprises further recesses 108, 108' (see FIG. 4) for the reception of the positioning means 109, 109'.

The positioning means 109, 109' are in a mounted condition of the microphone unit 105 at the foam layer 103 (see FIG. 5) taken up in the further recesses 108, 108' (not shown). The further recesses 108, 108' are formed as cylindrical drillings, in particular blind hole drillings. The two positioning means 109, 109' are in present embodiment each designed as protrusions (FIG. 6).

Figure 7:
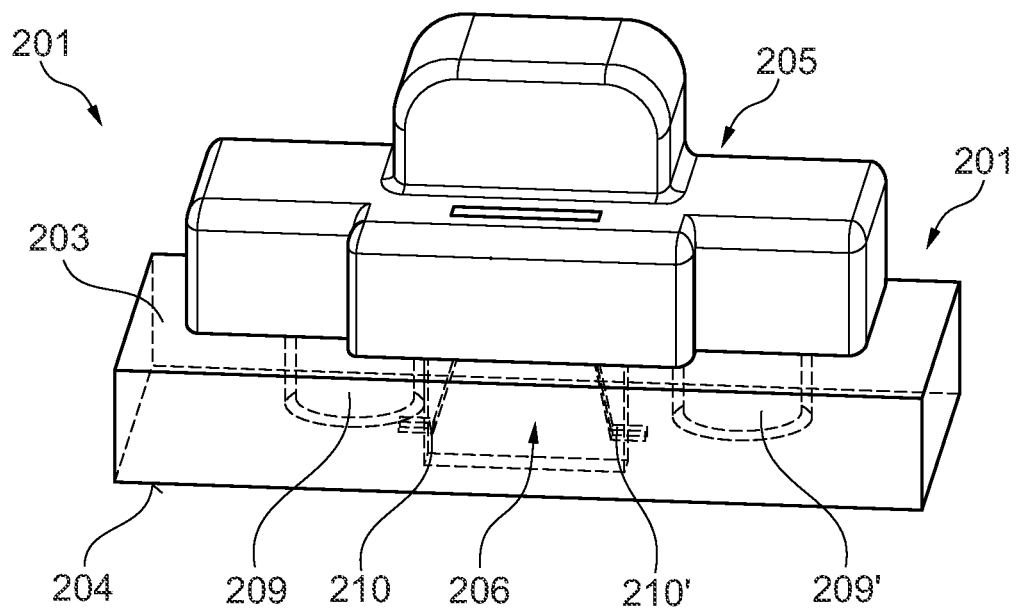
FIG. 7 shows a third embodiment of the roof structure according to the invention, wherein a microphone unit is arranged and fixed at a foam layer.

FIG. 7 shows the roof structure 201 according to the invention.

The roof structure 201 comprises a roof sky 202, wherein the roof sky 202 comprises a foam layer 203 and a surface layer 204 covering the foam layer 203.

The surface layer 204 preferably covers the foam layer 203 to a vehicle interior (not shown). The microphone unit 205 is—in a mounted condition at the foam layer or in the vehicle respectively—not visible viewed from a vehicle interior or an inside space of an vehicle, e.g. passenger compartment.

Figure 8:
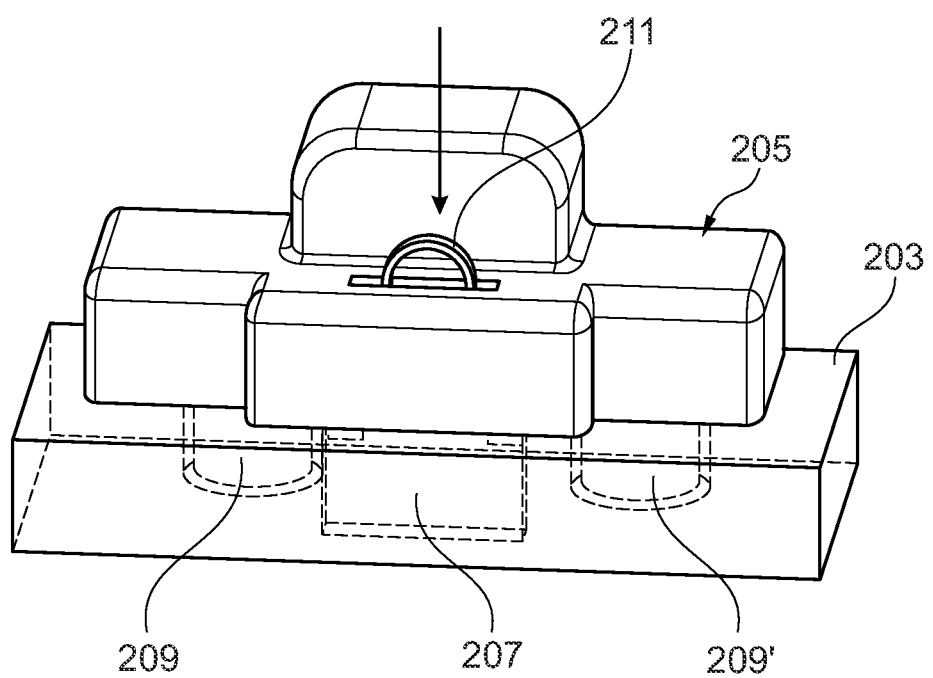
FIG. 8 shows the microphone unit according to FIG. 7 only being arranged at the foam layer of the roof structure.
Figure 9:
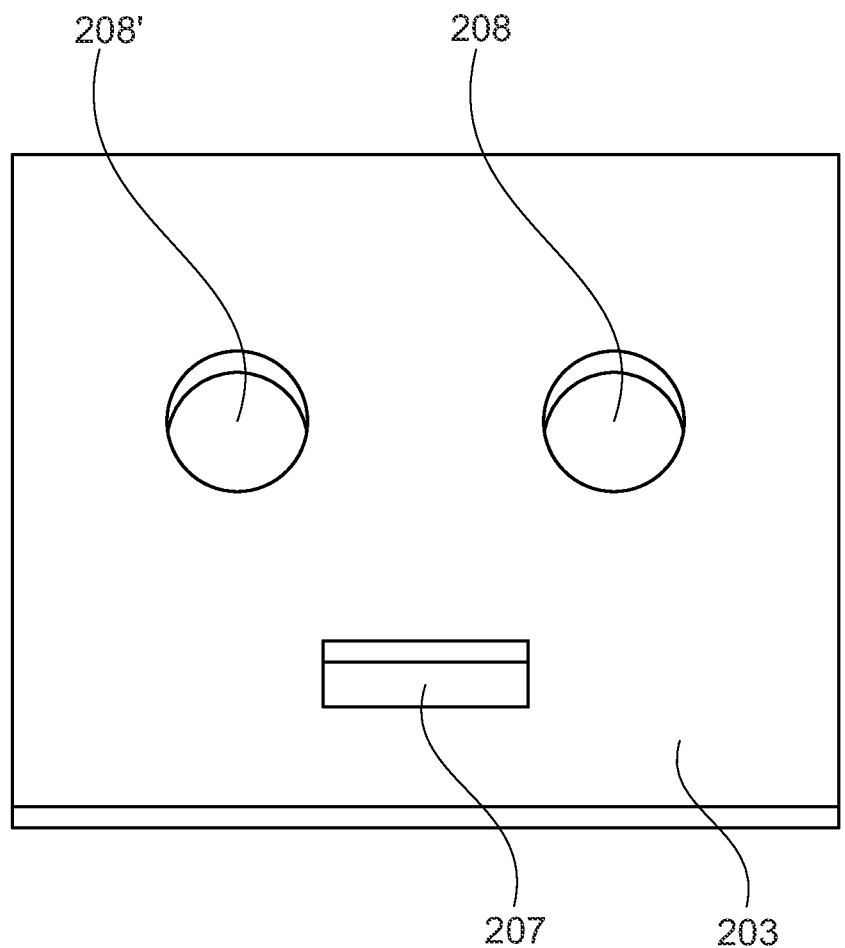
FIG. 9 shows a part of the foam layer of the roof structure according to the invention as shown in FIG. 8 in a perspective view.

The roof structure 201 further comprises a microphone unit 205 which is arranged at the foam layer 3 (see FIGS. 8 and 9). Mounting or fixation of the microphone unit 205 at the foam layer 203 is achieved via spring forces caused by a mounting means 206 (FIG. 8). Therefore, the microphone unit 205 comprises a mounting means 206 (see FIG. 9) and the foam layer 203 comprises a recess 207 (see FIG. 7) to receive the mounting means 206 of the microphone unit 205.

In a mounted condition of the microphone unit 205 at the foam layer 203, the microphone unit 205 is fixed by spring forces caused by mounting means 206 (see FIG. 7), which is designed as a clamping means.

Additional fixation of the microphone unit 205 is achieved by the fact, that the clamping means comprises two arms 210, 210', wherein the microphone unit 205 further comprises an activation means 211, wherein the arms 210, 210' of the clamping means are moveable by actuating the activation means 211 in such a manner that in a mounted condition of the microphone unit 205 the arms 210, 210 are spread at least partly into foam material of the foam layer 203 surrounding the recess 207.

The mounting means 206 of the microphone unit 205 is in a mounted condition partly arranged in the recess 207 and partly cut into a region of the material of the foam layer 203, which surrounds the recess 207 (see FIG. 7).

The recess 207 taking up the mounting means 206 is designed as a groove.

The non adhesive arrangement of the microphone unit 205 at the foam layer 203 enables to ensure high quality mounting of the microphone unit 205 in the roof structure 201 of the vehicle (not shown) and a simplified removing of the microphone unit 205 if necessary. It is a further advantage that the microphone unit 205 can be integrated in the roof structure 201 and in a vehicle respectively in an invisible way thereby maintaining a aesthetic impression of the roof structure 201 and the vehicle respectively.

The microphone unit 205 comprises positioning means 209, 209' (FIGS. 7 and 8) and the foam layer 203 comprises further recesses 208, 208' (FIG. 9) for the reception of the positioning means 209, 209'. The positioning means 209, 209' are in an mounted condition of the microphone unit 205 at the foam layer 203 (see FIGS. 7 and 8) taken up in the further recesses 208, 208'. The two positioning means 209, 209' are each designed as protrusions.

The recesses 208, 208' for the positioning means 209, 209' are formed as cylindrical drillings, in particular blind hole drillings.

Figure 10:
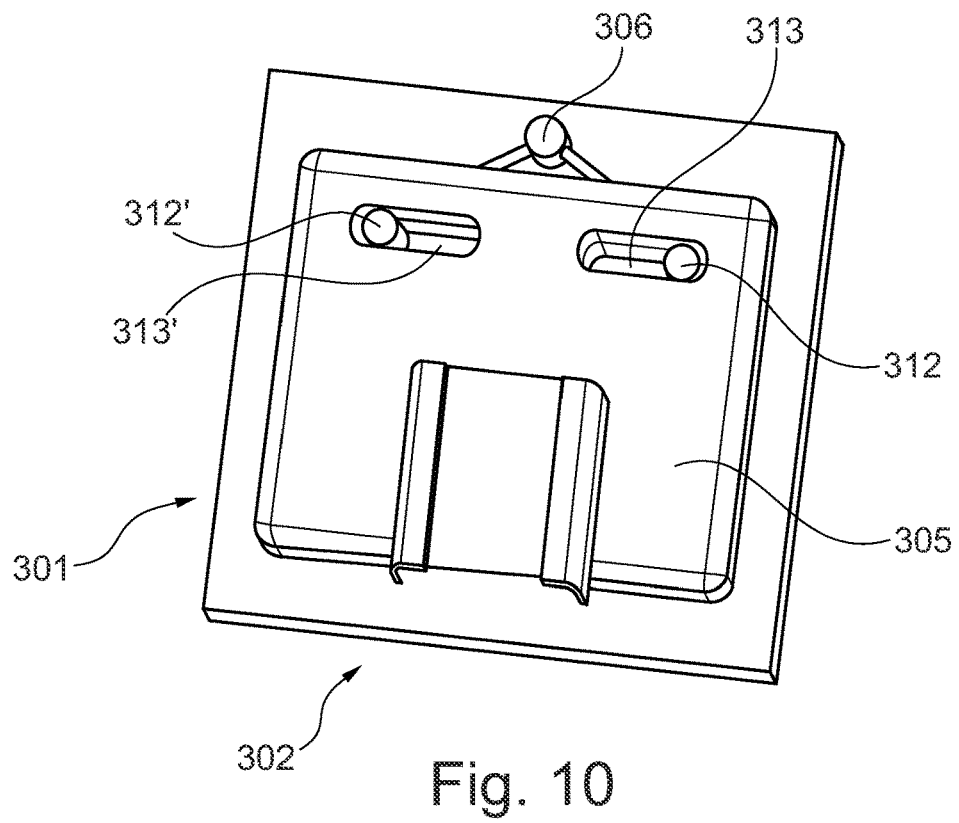
FIG. 10 shows a fourth embodiment of the roof structure according to the invention, wherein a microphone unit is arranged and fixed in the foam layer.
Figure 12:
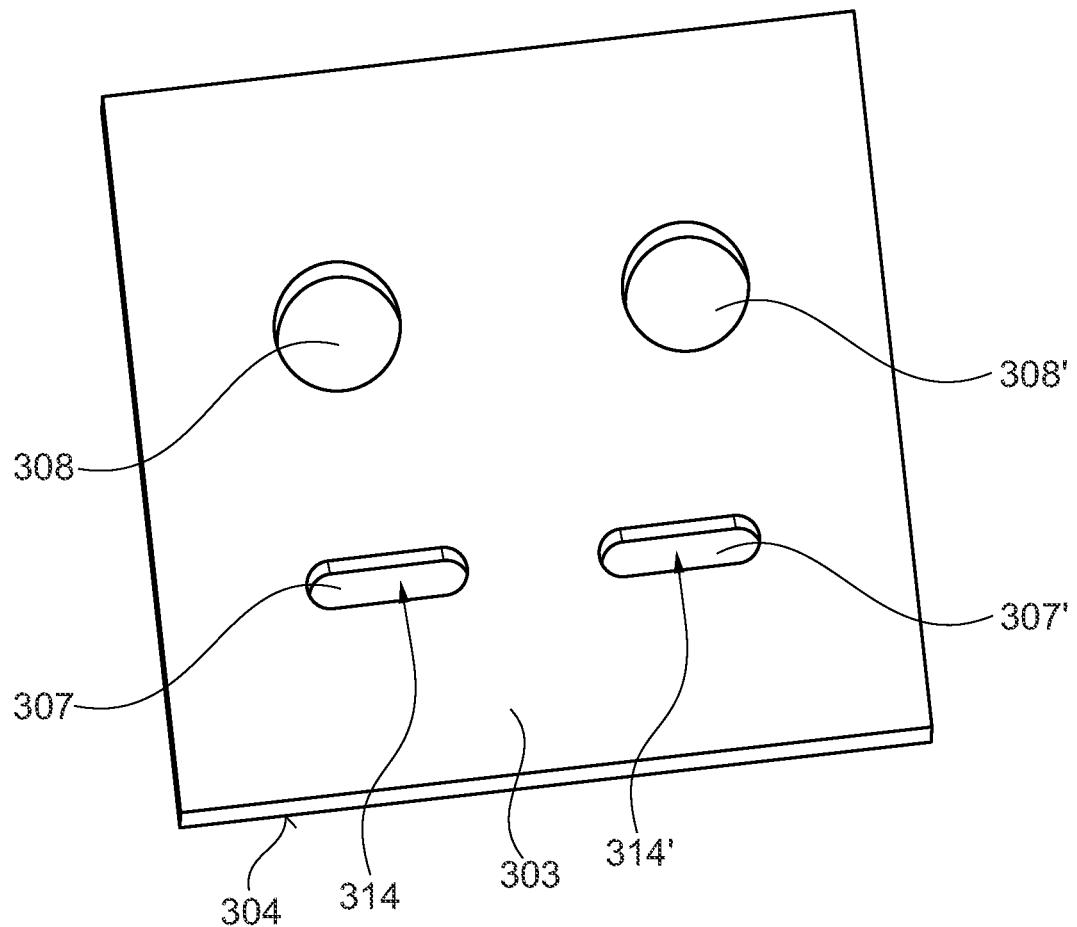
FIG. 12 shows a part of the foam layer of the roof structure according to the invention as shown in FIG. 10 in a perspective view.

FIG. 10 shows the roof structure 301 according to the invention, wherein the microphone unit 305 is arranged and fixed in the foam layer 303 (see also FIG. 12).

The roof structure 1 comprises a roof sky 302, wherein the roof sky 302 comprises a foam layer 303 and a surface layer 304 covering the foam layer 303 (see also FIG. 12).

The surface layer 304 preferably covers the foam layer 303 to a vehicle interior (not shown). The microphone unit 305 is—in a mounted condition at the foam layer or in the vehicle respectively—not visible viewed from a vehicle interior or an inside space of an vehicle, e.g. passenger compartment.

The roof structure 301 further comprises a microphone unit 305 which is arranged at the foam layer 303. Mounting or fixation of the microphone unit 305 at the foam layer 303 is achieved by mounting means 306.

Therefore, the microphone unit 305 comprises at least one mounting means 306 and the foam layer 303 comprises recesses 307, 307' to receive the mounting means 306. The mounting means 306 of the microphone unit 305 in a mounted condition of the microphone unit 305 according to FIG. 10 is arranged in the recess 307, 307' thereby holding the microphone unit 305 at the foam layer 303.

Mounting or fixation of the microphone unit 305 is achieved by spring forces caused by the mounting means 306 being designed as a clamping means.

Figure 11:
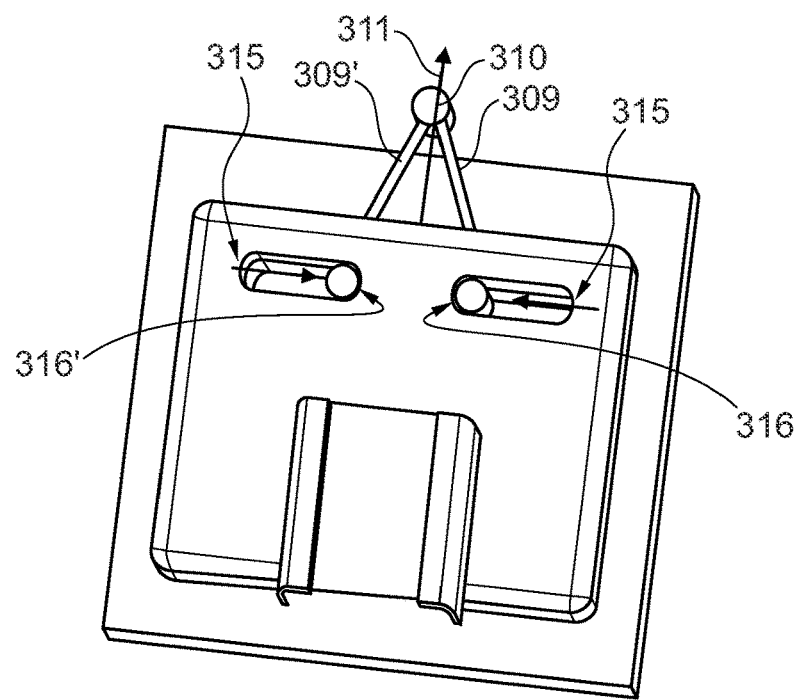
FIG. 11 shows the microphone unit according to FIG. 11 in unmounted condition.

The clamping means comprises two arms 309, 309' and a spring element 310, wherein a bolt 312, 312' is arranged at each arm 309, 309', wherein the arms 309, 309' are spreadable by the spring element 310, wherein the microphone unit 305 comprises two guideways 313, 313', wherein the guideways 313, 313' are designed in such a manner that the bolts 312, 312' are displaceable within the guideways 313, 313' in such a way that a distance of the bolts 312, 312' increases by stretching the spring element 310 and decreases by releasing the spring element 310, wherein as a groove 314, 314' designed recess is arranged in the foam layer 303 for guiding each bolt 312, 312' and for attachment of the microphone unit 305 to the foam layer 303, wherein the groove 314, 314' is limited by a circumferential wall 315, 315' (see FIG. 11) and wherein the bolts 312, 312' are in mounted condition of the microphone unit 305 each pressed by the spring element 310 (FIG. 11) in opposite orientated force directions against the walls 315, 315'.

The non-adhesive arrangement of the microphone unit 305 at the foam layer 303 enables to ensure high quality mounting of the microphone unit 305 in the roof structure 301 of the vehicle (not shown) and a simplified removing of the microphone unit 305 if necessary. It is a further advantage that the microphone unit 305 can be integrated in the roof structure 301 and in a vehicle respectively in an invisible way thereby maintaining an aesthetic impression of the roof structure 301 and the vehicle respectively.

Mounting and fixation of the microphone 305 unit can be achieved by moving, e.g. pulling spring element 310, which can be interpreted as a lock, the bolts 312, 312' thereby moving towards walls 316, 316'. Releasing of spring element 310 leads to movement of bolts back towards walls 315, 315' in a moving direction 311.

The microphone unit 305 comprises positioning means (not shown), and the foam layer 303 comprises further recesses 303, 308' (see FIG. 12) for the reception of the positioning means. The positioning means are in a mounted condition of the microphone unit 305 at the foam layer 303 (see FIG. 10 or FIG. 11) taken up in the further recesses 308, 308' (not shown).

The recesses 307, 30' for the mounting means 306 and the further recesses 308, 308' for the positioning means (not shown) are arranged oppositely (see FIG. 12).

The recesses 308, 308' for the positioning means are formed as cylindrical drillings, in particular as blind hole drillings.

Figure 13:
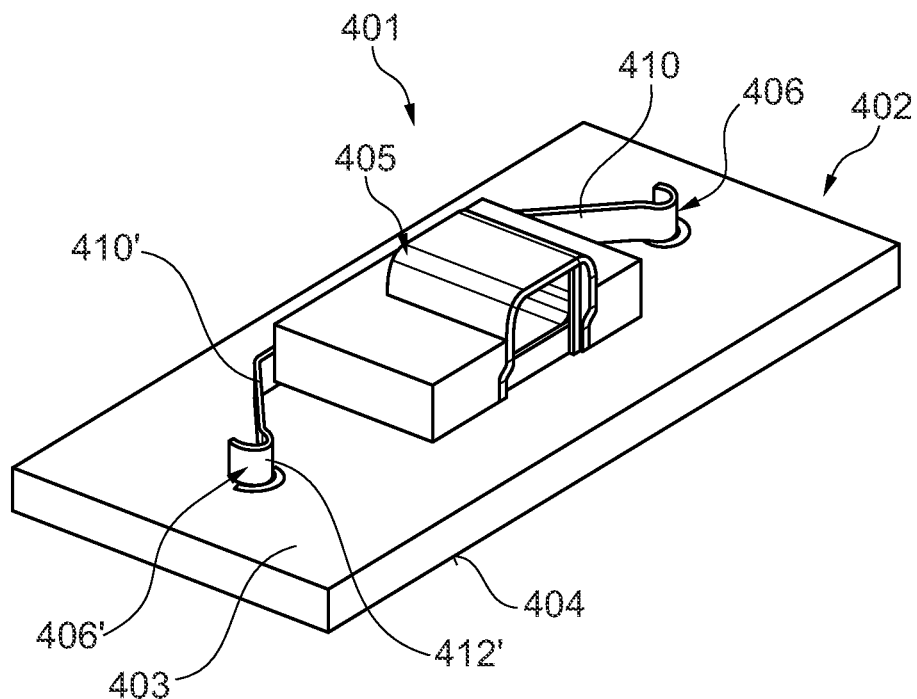
FIG. 13 shows a fifth embodiment of the roof structure according to the invention, wherein a microphone unit is arranged and fixed at a foam layer.
Figure 14:
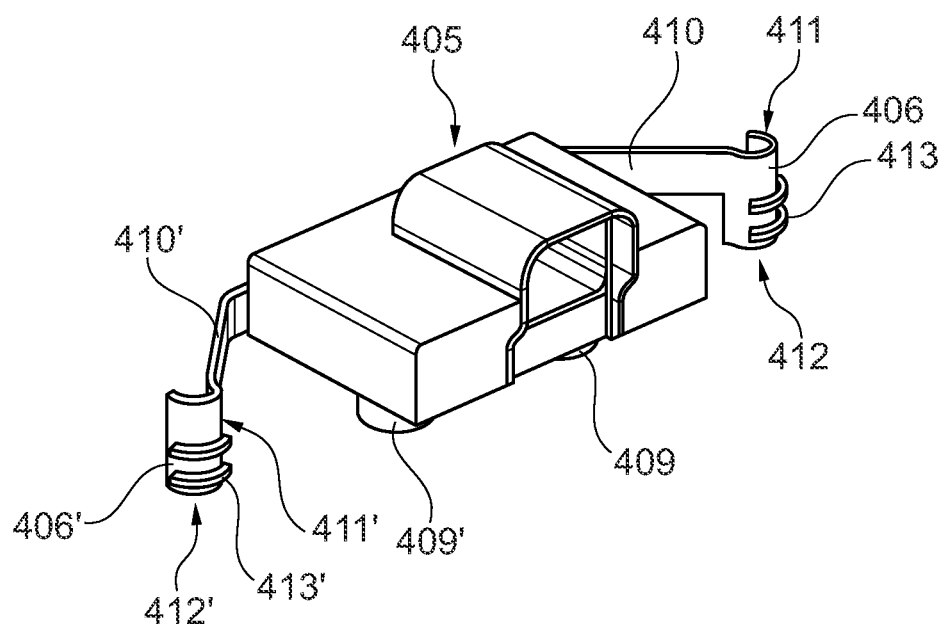
FIG. 14 shows the microphone unit according to FIG. 13 only being arranged in the foam layer of the roof structure.
Figure 15:
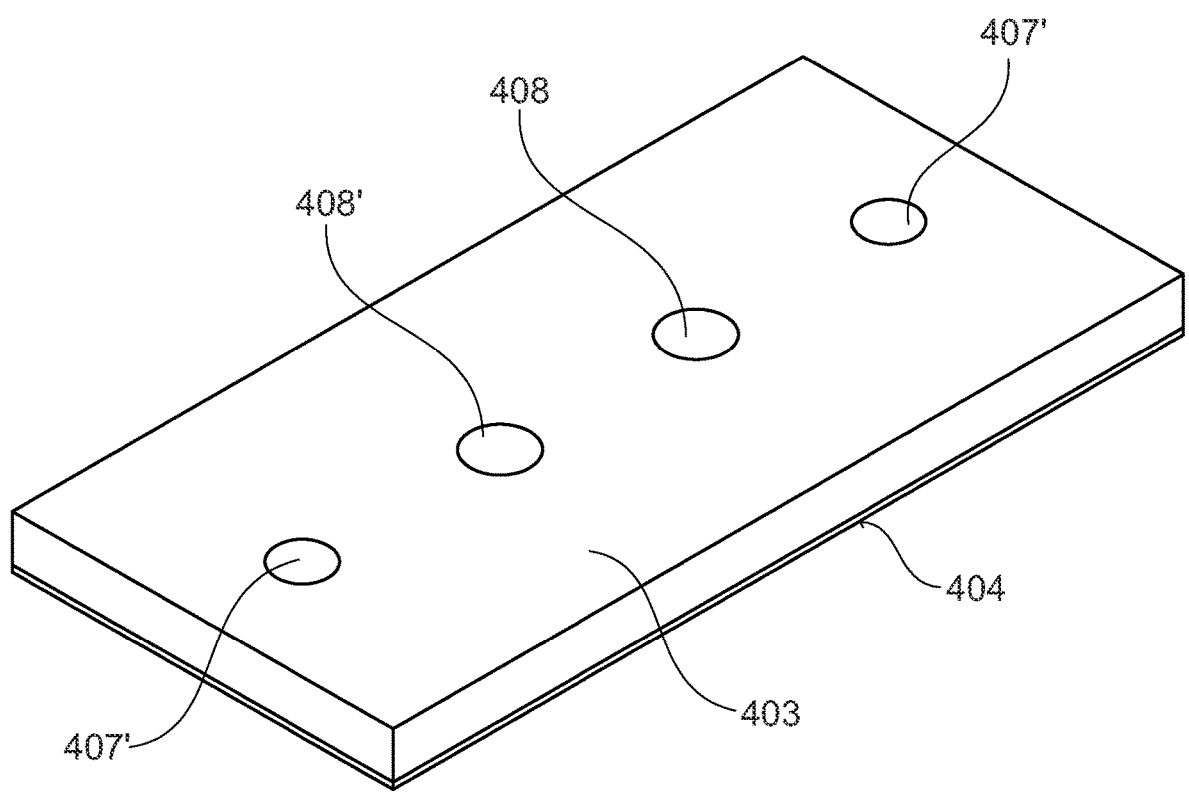
FIG. 15 shows a part of the foam layer of the roof structure according to the invention as shown in FIG. 13 in a perspective view.

FIG. 13 shows the roof structure 401 according to the invention, wherein the microphone unit 405 is arranged and fixed in the foam layer 403 (see also FIG. 15). The microphone unit 405 according to present invention is also shown in FIG. 14.

According to FIG. 13, the roof structure 401 comprises a roof sky 402, wherein the roof sky 402 comprises a foam layer 403 and a surface layer 404 (see FIG. 15) covering the foam layer 403 (see also FIG. 15).

The surface layer 404 preferably covers the foam layer 403 to a vehicle interior (not shown). The microphone unit 405 is—in a mounted condition at the foam layer or in the vehicle respectively—not visible viewed from a vehicle interior or an inside space of an vehicle, e.g. passenger compartment.

The roof structure 401 further comprises a microphone unit 405 which is arranged at the foam layer 403. Mounting or fixation of the microphone unit 405 at the foam layer 403 is achieved by mounting means 406, 406'.

Therefore, the microphone unit 405 comprises mounting means 406, 406' and the foam layer 403 comprises recesses 407, 407' (see FIG. 15) to receive the mounting means 406, 406'. The mounting means 406, 406' of the microphone unit 405 in a mounted condition of the microphone unit 405 at the foam layer 403 according to FIG. 13 is arranged in the recesses 407, 407' thereby holding the microphone unit 405 at the foam layer 403.

Mounting or fixation of the microphone unit 405 is achieved by spring forces caused by the mounting means 406, 406' being designed as a clamping means.

The microphone unit 405 (see also FIG. 14) comprises two clamping means as mounting means, wherein the clamping means are designed as spring arms 410, 410', wherein the clamping means in a mounted condition each intervene in a recess 407, 407' arranged in the foam layer 403.

The foam layer 403 comprises two further recesses 408, 408' (see FIG. 15) for the reception of two positioning means 409, 409' (see FIG. 14), comprised by the microphone unit 405, wherein the positioning means 409, 409' in a mounted condition of the microphone unit 405 at the foam layer 403 (see FIG. 13) are each taken up in the further recesses 408, 408', wherein the microphone unit 405 is in a mounted condition held at the foam layer 403 by retention forces generated by the spring arms 410, 410'.

From FIG. 15 it is apparent that the two recesses 407, 407' for the mounting means 406, 406' and the two recesses 408, 408' for the positioning means 409, 409' each being arranged on a meant line.

The non-adhesive arrangement of the microphone unit 405 at the foam layer 403 enables to ensure high quality mounting of the microphone unit 405 in the roof structure 401 of the vehicle (not shown) and a simplified removing of the microphone unit 405 necessary. It is a further advantage that the microphone unit 405 can be integrated in the roof structure 401 and in a vehicle respectively in an invisible way thereby maintaining an aesthetic impression of the roof structure 401 and the vehicle respectively.

The microphone unit 405 comprises positioning means 409, 409' (FIG. 14), and the foam layer 403 comprises further recesses 408, 408' (see FIG. 15) for the reception of the positioning means 409, 409'. The positioning means 409, 409' are in a mounted condition of the microphone unit 405 at the foam layer 403 taken up in the further recesses 408, 408'.

According to FIG. 14, free ends 411, 411' of the spring arms 410, 410', which are in a mounted condition of the microphone unit 405 taken up in the recesses 407, 407' are designed as curved pads 412, 412'.

The spring arms 410, 410' according to FIG. 14, in particular the pads 412, 412' of the spring arms 410, 410', each comprise at least one edge 413, 413'.

The recesses 407, 407' and the further recesses 403, 408' are formed as cylindrical drillings, in particular as blind hole drillings.

REFERENCE NUMERALS 1 roof structure
2 roof sky
3 foam or sandwich layer
4 surface layer
5 microphone unit
6, 6' mounting means
7, 7' recess
8, 8' further recess
9, 9' positioning means
10, 10' spring arm
11, 11' collar
12, 12' protrusion
13 glasfiber finish
14 lower part
101 roof structure
102 roof sky
103 foam layer
104 surface layer
105 microphone unit
106, 106' mounting means
107, 107' recess
108, 108' further recess
109, 109' positioning means
110 wing
201 roof structure
202 roof sky
203 foam layer
204 surface layer
205 microphone unit
206 mounting means
207 recess
208, 208' further recess
209, 209' positioning means
210, 210' arm
211 activation means
301 roof structure
302 roof sky
303 foam layer
304 surface layer
305 microphone unit
306 mounting means
307, 307' recess
308, 308' further recess
309, 309' arm
310 spring element
311 moving direction
312, 312' bolt.
313, 313' guideway
314, 314' groove
315, 315' wall (outer side)
316, 316' wall (inner side)
401 roof structure
402 roof sky
403 foam layer
404 surface layer
405 microphone unit
406, 406' mounting means
407, 407' recess 408, 408' further recess
409, 409' positioning means
410, 410' spring arms
411, 411' free end
412, 412' curved pad
413, 413' edge

The invention claimed is:

1. A roof structure for a vehicle, comprising:
a roof sky comprising a foam or sandwich layer and a surface layer covering the foam or sandwich layer to a vehicle interior; and
a microphone unit arranged at the foam or sandwich layer,
wherein the microphone unit comprises at least one mounting means,
wherein the foam or sandwich layer comprises at least one recess to receive the at least one mounting means and
wherein the mounting means of the microphone unit in a mounted condition of the microphone unit is arranged in the at least one recess, thereby holding the microphone unit at the foam or sandwich layer,
wherein the at least one mounting means is configured as a clamping means that attaches to the foam or sandwich layer by friction and is not glued, and
wherein the microphone unit is not visible from the vehicle interior.

2. The roof structure according to claim 1, wherein the microphone unit comprises at least one positioning means and the foam or sandwich layer comprises at least a further recess for the reception of the at least one positioning means, wherein the at least one positioning means is in an mounted condition of the microphone unit taken up in the at least one further recess.

3. The roof structure according to claim 1, wherein the microphone unit comprises two positioning means that are each configured as protrusions.

4. The roof structure according to claim 2, wherein the recess for the mounting means and the further recess for the positioning means are arranged oppositely.

5. The roof structure according to claim 4, wherein the at least one recess-for the positioning means is formed as a cylindrical blind hole drilling.

6. The roof structure according to claim 1, wherein:
the clamping means comprises two arms and a spring element,
a bolt is arranged at each of the two arms,
the two arms are spreadable by the spring element,
the microphone unit comprises two guideways configured so that the bolts are displaceable within the guideways in such a way that a distance of the bolts increases by stretching the spring element and decreases by releasing the spring element,
a groove recess is arranged in the foam layer for guiding each bolt and for attachment of the microphone unit to the foam layer,
the groove is limited by a circumferential wall, and
the bolts are in mounted condition of the microphone unit each pressed by the spring element in opposite orientated force directions against the walls.

7. The roof structure according to claim 3, wherein the protrusions are made of Evoprene.

8. The roof structure according claim 1, characterized in that, the mounting means is in a mounted condition partly arranged in the recess and partly cut into a region of the foam material of the foam layer, which surrounds the recess.

9. The roof structure according to claim 1, wherein the recess taking up the mounting means is a groove.

10. A vehicle, comprising: a roof structure according to claim 1.

* * * * *